(12) United States Patent
Sunvold (10) Patent No.: US 6,630,159 B2
(45) Date of Patent: *Oct. 7, 2003

(54) LIMITING WEIGHT GAIN OF CATS BY FEEDING CARBOHYDRATE SOURCE THAT EXCLUDES RICE

(75) Inventor: Gregory D. Sunvold, Eaton, OH (US)

(73) Assignee: The Procter & Gamble Company, Cincinnati, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/818,221

(22) Filed: Mar. 27, 2001

(65) Prior Publication Data

US 2001/0018067 A1 Aug. 30, 2001

Related U.S. Application Data

(63) Continuation-in-part of application No. 09/268,919, filed on Mar. 16, 1999, now Pat. No. 6,458,378, and a continuation-in-part of application No. 09/507,066, filed on Feb. 18, 2000, now Pat. No. 6,238,708, and a continuation-in-part of application No. 09/609,622, filed on Jul. 5, 2000.
(60) Provisional application No. 60/121,087, filed on Feb. 23, 1999, and provisional application No. 60/143,032, filed on Jul. 9, 1999.

(51) Int. Cl.$^7$ .................. A01N 65/00; A61K 35/78; A23K 1/00; A23K 1/17; A23L 1/28
(52) U.S. Cl. .................. 424/442; 424/750; 426/2; 426/60; 426/623; 426/805
(58) Field of Search ............. 424/93.1, 195.1, 424/442, 750; 426/61, 2, 60, 623, 805

(56) References Cited

U.S. PATENT DOCUMENTS

| | | |
|---|---|---|
| 4,656,191 A | 4/1987 | Fanelli |
| 4,828,846 A | 5/1989 | Rasco et al. |
| 4,883,672 A | 11/1989 | Shug et al. |
| 5,030,458 A | 7/1991 | Shug et al. |
| 5,085,883 A | 2/1992 | Garleb et al. |
| 5,087,623 A | 2/1992 | Boynton et al. |
| 5,104,677 A | 4/1992 | Behr et al. |
| 5,175,156 A | 12/1992 | Boynton et al. |
| 5,192,804 A | 3/1993 | Blum et al. |
| 5,240,962 A | 8/1993 | Nakatsu et al. |
| 5,501,857 A | 3/1996 | Zimmer |
| 5,540,917 A | 7/1996 | Isler et al. |
| 5,573,306 A | 11/1996 | Dressman et al. |
| 5,585,366 A | 12/1996 | Gallaher et al. |
| 5,605,893 A | 2/1997 | Kaufman |
| 5,616,569 A | 4/1997 | Reinhart |
| 5,626,849 A | 5/1997 | Hastings et al. |
| 5,654,028 A | 8/1997 | Christensen et al. |
| 5,714,472 A | 2/1998 | Gray et al. |
| 5,730,988 A | 3/1998 | Womack |
| 5,846,581 A | 12/1998 | Catron |
| 5,869,528 A | 2/1999 | Cavazza |
| 5,895,652 A | 4/1999 | Giampapa |
| 5,932,258 A | 8/1999 | Sunvold |

FOREIGN PATENT DOCUMENTS

| | | |
|---|---|---|
| CN | 1135850 A | 11/1996 |
| DE | 39 04 109 A | 8/1989 |
| FR | 2 735 331 A | 12/1996 |
| GB | 2 309 370 A | 7/1997 |
| JP | 03094655 | 4/1991 |
| JP | 1166795 A2 | 10/1999 |
| JP | WO 00/11964 A1 | 3/2000 |
| WO | WO 89/10065 A | 11/1989 |
| WO | WO 92/16218 | 10/1992 |
| WO | WO 98/44932 A1 | 10/1998 |
| WO | WO 99/51108 A1 | 10/1999 |
| WO | WO 00/49891 A1 | 8/2000 |
| WO | WO 01/03691 A1 | 1/2001 |

OTHER PUBLICATIONS

Sunvold et al., "The Glycemic Response to Dietary Starch" Recent Advances In Canine and Feline Nutrition vol. II, 1998 Iams Nutrition Symposium Proceedings, pp. 123–131.
Becker, Ross, "Iams Revamps Dog Foods" Good Dog! Magazine, Sep./Oct. 1999, p. 20.
Roberts, Susan B., "High–glycemic Index Foods, Hunger, and Obesity: Is There a Connection?" Nutrition Reviews, vol. 58, No. 6, pp. 163–169.
Ludwig, David S., "Dietary Glycemic Index and Obesity" American Society for Nutritional Sciences, pp. 280S–283S.
Liang et al., "Effect of Pressure, Mositure, and Cooking Time on Susceptibility of Corn or Sorghum Grain Starch to Enzyme Attack" Journal of Dairy Science, vol. 53, Jan.–Dec. 1970, pp. 336–341.
Owen, K.Q., et al., "Effect of L–Carnitine and Soybean Oil on Growth Performance and Body Composition of Early–Weaned Pigs" J. Anim. Sci. 74, 1996, pp. 1612–1619.
Abstract—Sunvold, G.D. et al., "Effect of dietary carnitine during energy restriction in the canine" FASEB Journal, vol. 13, No. 4, Part 1, 1999, p. A268.
Abstract—Freeman, L.M., "Interventional nutrition for cardiac disease" Seminars in Veterinary Medicine and Surgery (Small Animal), vol. 13, No. 4, 1998, pp. 232–237.

(List continued on next page.)

Primary Examiner—David M. Naff
Assistant Examiner—Deborah K. Ware
(74) Attorney, Agent, or Firm—Kelly L. McDow-Dunham; Karen F. Clark (57) ABSTRACT

A process is provided for limiting weight gain in cats. The process includes feeding the cat a pet food composition that includes a source of protein, a source of fat, and a source of carbohydrates from a grain source that excludes rice. Use of preferred low glycemic index grain sources that comprise a blend of corn and sorghum; a blend of corn, sorghum, and barley; or a blend of corn, sorghum, and oats, has the effect of decreasing the postprandial blood glucose and insulin response of the cat as compared to when feeding a rice-based diet. The result is that the animal becomes satiated and voluntarily decreases its intake of food, causing less weight gain. This effect is even more marked when the composition is fed to male cats.

30 Claims, 10 Drawing Sheets

OTHER PUBLICATIONS

Abstract—Gross, K.L. et al., "Relationship of plasma carnitine levels in dogs and pigs fed supplemental dietary L–carnitine" Journal of Dairy Science, vol. 81, No. Suppl. 1, 1998, p. 186.

Abstract—Gross, K.L. et al., "Effect of dietary carnitine or chromium on weight loss and body composition of obese dogs" Journal of Dairy Science, vol. 81, No. Suppl. 1, 1998, p. 175

Abstract—Kittleson, M.D. et al., "Results of the Multicenter Spaniel Trial: Taurine– and carnitine–responsive dilated cardiomyopathy in American Cocker Spaniels with decreased plasma taurine concentrations" Journal of Veterinary Internal Medicine, vol. 11, No. 4, 1997, pp. 204–211.

Abstract—Gwathmey, J.K. et al., "Pathophysiology of cardiomyopathies: Part II. Drug–induced and other interventions" Current Opinion in Cardiology, vol. 9, No. 3, 1994, pp. 369–378.

Abstract—Grandjean, D. et al., "Dietary supplementation with L–carnitine, vitamin C and vitamin B12 in sport dogs: Experimental study with sledge dogs" Recueil de Medecine Veterinaire de I'Ecole d'Alfort, vol. 169, No. 7, 1993, pp. 543–551.

Abstract—McMillin, J.B. et al., "Influence of Dietary Fish Oil on Mitochondrial Function and Response to Ischemia" Am. J. Physiol., vol. 263, No. 5 Part 2, 1992, pp. H1479–H1485.

Abstract—Grandjean, D. et al., "Ergogenic Nutritional Supplementation in Efforts of Sporting Dogs" Recl. Med. Vet. Ec. Alfort, vol. 167, No. 7–8, 1991, pp. 753–761.

Abstract—Iben, C., "Effect of L–carnitine in racing sledge dogs" Wiener Tierarztliche Monatsschrift, vol. 85, No. 10, 1998, pp. 334–339.

Abstract—Goodwin, J.K., et al., "The role of dietary modification and nondrug therapy in dogs and cats with congestive heart failure" Veterinary Medicine, vol. 93, No. 10, 1998, pp. 919–926.

Abstract—Chetboul, V. et al., "Use of Isulik (R), and L carnitine supplement, in canine dilated cardiomyopathy" Point Veterinaire, vol. 29, No. 189, 1998, pp. 167–168.

Abstract—Grandjean, D. et al., "Physiopathological importance of L. carnitine in dogs" Recueil de Medecine Veterinaire, vol. 173, No. 4/5/6, 1997, pp. 95–106.

Abstract—Jacobs, G.J., "Treating cardiomyopathy in dogs and cats" Veterinary Medicine, vol. 91, No. 6, 1996, pp. 544–564.

Abstract—McEntee, K. et al., "Clinical, electrocardiographic, and echocardiographic improvements after L–carnitine supplementation in a cardiomyopathic Labrador" Canine Practice, vol. 20, No. 2, 1995, pp. 12–15.

Abstract—Costa, N.D. et al., "Case report: efficacy of oral carnitine therapy for dilated cardiomyopathy in boxer dogs" Journal of Nutrition, vol. 124, No. 12 Suppl. 1994, pp. 2687S–2692S.

Abstract—Keene, B.W., "L–carnitine supplementation in the therapy of canine dilated cardiomyophathy" Vet Clin North Am Small Anim Pract, vol. 21, No. 5, Sep. 1991, pp. 1005–1009.

Abstract—Hamlin, R.L., "Nutrition and the heart" Vet Clin North Am Small Anim Pract, vol. 19, No. 3, May 1989, pp. 527–538.

Abstract—Birkhahn, R.H. et al., "Alternate or supplemental energy sources" JPEN J Parenter Enteral Nutr, vol. 5, No. 1, Jan.–Feb. 1981, pp. 24–31.

Abstract—Suzuki, Y. et al., "Effects of L–carnitine on ventricular arrhythmias in dogs with acute myocardial ischemia and a supplement of excess free fatty acids" Jpn Circ J, vol. 45, No. 5, May 1981, pp. 552–559.

Sunvold, G. et al., "Effect of Fermentable Fiber Consumption by the Dog on Nitrogen Balance and Fecal Microbia Nitrogen Excretion" FASEB Journal, US, Fed. of American Soc. For Experimental Biology, Bethesda, MD, vol. 10, Jan. 1, 1996, p. A257.

Murray, S.M. et al., "Cereal Flour Incorporation into Premium Diets Fed to Ileal Connulated Dogs" FASEB Journal, vol. 11, 1997, p. a414.

Harrington–McGill, S., "Eat Right or Die Young" Dec. 12, 1996, pp. 1–2.

Massimino, S.P. et al., "Glucose Tolerance in Old Dogs is Modified by Starch Source" FASEB Journal, vol. 13, Mar. 12, 1999, p. a375.

Bergman et al., "Quantitative estimation of insulin sensitivity" American Physiological Society, 1979, vol. 236(6), pp. E–667–677.

Bergman et al., "Physiologic Evaluation of Factors Controlling Glucose Tolerance in Man" J. Clin. Invest., 1981, vol. 68, pp. 1456–1467.

Milla et al., "Glycemic Response to Dietary Supplements in Cystic Fibrosis is Dependent on the Carbohydrate Content of the Formula" JPEN, vol. 20, No. 3, 1996, pp. 182–186.

McCarty, M.F., "Promotion of Hepatic Lipid Oxidation and Gluconeogenesis as a Strategy for Appetite Control" Medical Hypotheses, vol. 42, 1994, pp. 215–225.

Van Kempen, Theo A.T.G. et al., "Carnitine Affects Octanoate Oxidation to Carbon Dioxide and Dicarboxylic Acids in Colostrum–Deprived Piglets: In Vivo Analysis of Mechanisms Involved Based on CoA– and Carnitine–Ester Profiles" J. Nutr. 125, 1995, pp. 238–250.

Ji, H et al., "Atlanta Salmon (Salmo salar) Fed L–Carnitine Exhibit Altered Intermediary Metabolism and Reduced Tissue Lipid, but No Change in Growth Rate" J. Nutr. 126, 1996, pp. 1937–1950.

"Purina CNM Veterinary Product Guide, 1994".

Kumar, M.V. et al., "Differential effects of retinoic acid on uncoupling protein–1 and leptin gene expression" J. Endocrinol, May 1998, pp. 1–7.

Wolf, D.P., "A Regulatory Pathway of Thermogenesis in Brown Fat Through Retinoic Acid" Nutrition Reviews, vol. 53, No. 8, 1995, pp. 230–231.

Alvarez, R. et al., "A Novel Regulatory Pathway of Brown Fat Thermogenesis" J. of Biol. Chem., 1995, pp. 5666–5673.

Suryawan, A. et al., "Effect of Retinoic Acid on Differentiation of Cultured Pig Preadipocytes" J. Anim. Sci. 1997, pp. 112–117.

Puigserver, P. et al., "In vitro and in vivo induction of brown adipocyte uncoupling protein (thermogenin) by retinoic acid" Biochem J., 1996, pp. 827–833.

Facchini, F. et al., "Relation between dietary vitamin intake and resistance to insulin–mediated glucose disposal in healthy volunteers 1–3" American J Clin Nutr, 1996, pp. 946–949.

Abstract—Scarpace, P.J. et al., "Thermoregulation with age: role of thermogenesis and uncoupling protein expression in brown adipose tissue" Proc Soc Exp Biol Med, Feb. 1994.

Cassard–Doulcier et al., "In Vitro Interactions in between Nuclear Proteins and Uncoupling Proetin Gene Promoter Reveal Several Putative Transactivating Factors Including Ets 1, Retinoid X Receptor, Thyroid Hormone Receptor, and a CACCC Box–binding Protein" J. of Biol. Chem., 1994, pp. 24335–24342.

McCance et al., "The Composition of Foods" Royal Soc. Chemistry, 1992, p. 81.

LIMITING WEIGHT GAIN OF CATS BY FEEDING CARBOHYDRATE SOURCE THAT EXCLUDES RICE

CROSS-REFERENCE TO RELATED APPLICATIONS

This application is a continuation-in-part of the following U.S. patent applications, the disclosures of which are incorporated herein by reference: Ser. No. 09/268,919, filed Mar. 16, 1999 now U.S. Pat. No. 6,458,378; Ser. No. 09/507,066, filed Feb. 18, 2000 now U.S. Pat. No. 6,238,708 which claims priority to U.S. provisional application Serial No. 60/121,087, filed Feb. 23, 1999; and Ser. No. 09/609,622, filed Jul. 5, 2000 which claims priority to U.S. provisional application Serial No. 60/143,032, filed Jul. 9, 1999.

BACKGROUND OF THE INVENTION

This invention relates to a process of administering a pet food composition to prevent obesity in companion animals, such as cats and dogs. More particularly, the invention relates to a process for limiting weight gain in cats. The invention is further directed to a process for decreasing the postprandial blood glucose and insulin response in cats to promote satiety and a voluntary decrease in food intake.

Obesity is a significant health concern in companion animals. Veterinary care professionals have reported that approximately 20–40% of the pets in their care are overweight. These animals bear a greater risk for health problems associated with the respiratory, cardiovascular, and skeletal systems. More particularly, obese feline patients have demonstrated greater susceptibility to diseases such as diabetes mellitus, osteoarthritis, ligament injuries, perineal dermatitis, cardiomyopathy, and hepatic lipidosis. Accordingly, new technologies meeting the health needs of obese feline patients are in high demand by pet owners and veterinarians alike.

The causes of feline obesity include sedentary lifestyle and confinement indoors, as well as improper nutrition, genetic predisposition, and hormonal disorders such as thyroid and pituitary gland dysfunction. Moreover, spayed and neutered cats often exhibit a decrease in their physical activity and metabolism and therefore, have a greater tendency to gain weight.

An effective weight loss regimen for cats includes a two-tiered approach involving increasing the amount of exercise the animal undergoes, while also decreasing the amount of calories ingested by the animal. It has been suggested that pet owners can increase their cat's daily exercise through harnessed walks, or several periods of play with a favorite toy. However, the challenge in combating feline obesity is providing a diet that fulfills the feline patient's nutritional requirements, while still lowering the animal's caloric intake and promoting satiety.

In an attempt to meet this challenge, pet owners are often faced with a choice between limiting their pet's food intake by restricting the amount of food made available to the pet, or providing the pet with a dietary formulation that contains less of those ingredients that have been shown to promote obesity. Given these choices, some prefer to accept the fact that their pets will either become or remain overweight. Unfortunately, as is the case with humans, excess body fat can have serious health implications.

Current nutritional recommendations for treatment of obesity in companion animals include the consumption of diets high in fiber to dilute the caloric content thereof. However, high fiber diets are often associated with several undesirable side effects that include decreased palatability of food, improper mineral balance, decreased food digestibility, increased stool volume, constipation and/or increased frequency of defecation, and poor skin and hair coat. Unfortunately, although high fiber diets have been available for many years, the prevalence of obesity in companion animals has continued to increase.

In addition, impaired glucose metabolism and hyperinsulinemia, together with abnormal blood glucose and insulin responses, have been associated with obesity in companion animals, including overweight cats. In general, when high blood glucose levels are maintained, the body can use the extra glucose to produce fats. Storage of these fats contributes to weight gain. By enhancing fat synthesis, this metabolic alteration can lead to continued weight gain and further the progression of obesity.

U.S. Pat. No. 5,932,258 and U.S. patent application Ser. No. 09/268,919 now U.S. Pat. No. 6,458,378 and Ser. No. 09/507,066 now U.S. Pat. No. 6,238,708, which are incorporated herein by reference, describe feeding diets to companion animals that contain a carbohydrate source other than rice as effective for controlling the postprandial glycemic and insulin response. These references teach that by counteracting the effects of impaired glucose metabolism and hyperinsulinemia, such a diet can help lessen the progression of obesity. However, the preceding references do not teach a diet containing a carbohydrate source that assists in weight management in cats.

U.S. Ser. No. 09/609,622, which has been incorporated herein by reference, teaches a process for promoting weight loss in a mammal by feeding a composition that contains a source of carbohydrates selected from a low glycemic index grain, such as sorghum, barley, corn, and blends thereof. This reference further teaches that reducing starch levels and/or selecting sources of carbohydrates having low glycemic indices improves glucose metabolism, resulting in fewer abrupt rises and drops in blood glucose levels. As a result, the individual feels satiated more often, consumes less food, and loses weight.

It would be desirable to be able to improve body composition in obese feline animals by decreasing their caloric intake. It would also be desirable to be able to maintain favorable body composition, in even seemingly healthy cats with no overt symptoms, to prevent the onset of obesity in those animals that have a tendency to become obese. Accordingly, there is a need in the present art to develop alternative nutritional means to prevent obesity in cats.

SUMMARY OF THE INVENTION

The present invention meets that need by providing a process of administering a pet food composition to limit weight gain in a cat. In accordance with one aspect of the present invention, a process is provided for limiting weight gain in a cat comprising the step of feeding the cat a pet food composition comprising a source of protein, a source of fat, and a source of carbohydrates from a grain source that excludes rice. It has been found that a pet food composition that employs as the carbohydrate source a low glycemic index grain, which is selected from the group consisting of corn, sorghum, barley, oats, and blends thereof, when fed to a cat, has the effect of decreasing the postprandial blood glucose and insulin response of the cat as compared to diets using rice as the primary carbohydrate source. Preferably, the grain source has a glycemic index that is less than rice.

Reducing starch levels and/or selecting sources of carbohydrates/starches having low glycemic indicies improves glucose metabolism in cats. Improved glucose metabolism results in fewer abrupt rises and drops in blood glucose levels. Accordingly, feeding the pet food composition of the present invention ad libitum, promotes satiety in the cat. This effect promotes a voluntary decrease in food intake resulting in less weight gain than if the cat had been fed a diet that employs or includes rice or other high glycemic index starch as the carbohydrate source. This effect is even more pronounced when the composition is fed to male cats.

Where the low glycemic index grain source is a blend of corn and sorghum, it is preferred that these starch sources be present in the composition in a weight ratio from between about 1:5 to about 5:1, more preferably from about 1:3 to about 3:1, and most preferably about 1:1. Where the low glycemic index grain source is a blend of corn, sorghum, and barley, or corn, sorghum, and oats, it is preferred that these starch sources be present in the composition in a weight ratio of from between about 1:1:5 to about 1:5:1 to about 5:1:1, more preferably from about 1:1:3 to about 1:3:1 to about 3:1:1, and most preferably from about 1:1:1, respectively.

The composition can comprise from about 25 to about 45% crude protein, from about 4 to about 30% fat, from about 2 to about 20% total dietary fiber, and a source of carbohydrates that excludes rice, but includes a low glycemic index grain source such as corn, sorghum, barley, oats, and blends thereof. Typically, the carbohydrate sources in the composition of the present invention will make up from about 35 to about 60 weight percent of the composition.

The pet food composition may further comprise from about 1 to about 11 weight percent of supplemental total dietary fiber of fermentable fibers that have an organic matter disappearance of 15 to 60 weight percent when fermented by fecal bacteria for a 24 hour period.

Accordingly, it is a feature of the present invention to provide a composition and process of administering it to limit weight gain in cats. This, and other features and advantages of the present invention, will become apparent from the following detailed description, the accompanying drawings, and the appended claims.

DETAILED DESCRIPTION OF THE PREFERRED EMBODIMENTS

The present invention utilizes a pet food composition that excludes rice but includes a low glycemic index grain source that aids in limiting weight gain in cats. Preferably, the grain source has a glycemic index that is less than rice.

Reference is made to co-pending U.S. patent application Ser. No. 09/609,622, which has been incorporated herein by reference for its teaching of low glycemic index grains. Glycemic index is a measure of the rate at which carbohydrates are broken down into glucose and absorbed by the bloodstream. Glycemic index is a relative scale measured from a reference standard food (normally 50 gm white bread=100). By "low glycemic index" it is meant that the starch source provides a glycemic response that is closer to fasting glucose and insulin levels than a reference standard carbohydrate source.

Suitable low glycemic index grains for use with the present invention include corn, sorghum, barley, oats, and blends thereof. Preferred blends of low glycemic index grains can include corn and sorghum; corn, sorghum, and barley; or corn, sorghum, and oats. Brewer's rice is not a suitable grain source for the present invention. In a healthy feline animal, the presence of rice as a dietary starch source affects the animal in that it eats more and gains more weight. Feeding the pet food composition of the present invention ad libitum, which comprises sources of carbohydrates having low glycemic indices, affects the animal in that it feels satiated more often, resulting in a voluntary decrease in food intake and less weight gain. This effect is even more marked in male felines.

The pet food composition can be any suitable pet food formula that also provides adequate nutrition for the cat. For example, a typical feline diet for use in the present invention may contain from about 25 to about 45% crude protein (and preferably from about 25 to about 35%), from about 4 to about 30% fat (and preferably from about 10 to about 18%), and from about 2 to about 20% total dietary fiber, along with the starch source, all percentages by weight. Typically, the carbohydrate sources in the composition of the present invention will make up from about 35 to about 60 weight percent, and preferably from about 40 to about 55 weight percent, of the composition. A preferred source of corn is ground corn meal.

The pet food composition of the present invention may also optionally contain a source of fermentable fibers that display certain organic matter disappearance percentages. The fermentable fibers that may be used have an organic matter disappearance (OMD) of from about 15 to 60 percent when fermented by fecal bacteria in vitro for a 24 hour period. That is, from about 15 to 60 percent of the total organic matter originally present is fermented and converted by the fecal bacteria. The organic matter disappearance of the fibers is preferably 20 to 50 percent, and most preferably is 30 to 40 percent.

Thus, in vitro OMD percentage may be calculated as follows:

$$\{1-[(OM\ residue-OM\ blank)/OM\ initial]\} \times 100,$$

where OM residue is the organic matter recovered after 24 hours of fermentation, OM blank is the organic matter recovered in corresponding blank tubes (i.e., tubes containing medium and diluted feces, but no substrate), and OM initial is that organic matter placed into the tube prior to fermentation. Additional details of the procedure are found in Sunvold et al., J. Anim. Sci. 1995, vol. 73:1099–1109.

The fermentable fibers may be any fiber source that intestinal bacteria present in the animal can ferment to produce significant quantities of short chain fatty acids (SCFAs). "Significant quantities" of SCFAs, for purposes of this invention, are amounts over 0.5 mmol of total SCFAs/ gram of substrate in a 24-hour period. Preferred fibers include beet pulp, gum arabic (including gum talha), psyllium, rice bran, carob bean gum, citrus pulp, pectin, fructooligosaccharides and inulin, mannanoligosaccharides and mixtures of these fibers.

The fermentable fibers are used in the pet food composition in amounts from 1 to 11 weight percent of supplemental total dietary fiber, preferably from 2 to 9 weight percent, more preferably from 3 to 7 weight percent, and most preferably from 4 to 7 weight percent.

A definition of "supplemental total dietary fiber" first requires an explanation of "total dietary fiber". "Total dietary fiber" is defined as the residue of plant food that is resistant to hydrolysis by animal digestive enzymes. The main components of total dietary fiber are cellulose, hemicellulose, pectin, lignin, and gums (as opposed to "crude fiber", which only contains some forms of cellulose and lignin). "Supplemental total dietary fiber" is that dietary fiber which is added to a food product above and beyond any dietary fiber naturally present in other components of the food product. Also, a "fiber source" is considered such when it consists predominantly of fiber.

Typically, the amount of the pet food composition of the present invention that can be provided to a cat can be between about 40 and about 110 g/day when fed ad libitum.

In order that the invention may be more readily understood, reference is made to the following example that is intended to illustrate the invention, but not limit the scope thereof.

EXAMPLE 1

Two groups of eight young adult neutered and ovariectomized cats (6 males and 10 females) were used. The ages of the cats ranged from approximately 1 to 5 years of age and were of normal body weight at the initiation of the study. The procedures for this study and the care and handling of these animals were reviewed and approved by the Animal Experimentation Ethics Committee and the cats were treated humanely and ethically during the entire study period.

The cats were housed individually for a minimum of two weeks to become accustomed to the test holding facilities. The cats were then transferred to a different facility where they were group housed for approximately 3–4 months. Prior to the initiation of the study the animals were fed a dietary composition, which consisted of a commercially available dry cat food (Iams Original Formula Cat Food).

During the study period, two experimental dietary compositions were provided to the animals. Both experimental diets were chicken-based and formulated to provide for the maintenance needs of adult cats. The diets were essentially identical in nutrient composition and caloric content, but varied in the starch (primary carbohydrate) source. One experimental diet was rice-based, while the other had a blend of corn and grain sorghum. The ingredient composition of the two experimental diets is summarized in Table 1 below.

TABLE 1

Ingredient Composition of Experimental Diets Tested

| INGREDIENT | RICE-BASED DIET (% OF MIX) | CORN/SORGHUM-BASED DIET (% OF MIX) |
|---|---|---|
| Brewers Rice | 40.7 | |
| Corn | | 24.1 |
| Sorghum | | 24.1 |
| Chicken By Product Meal | 23.5 | 23.5 |
| Chicken | 14.8 | 6.9 |
| Chicken Fat | 6.1 | 5.7 |
| Beet Pulp | 5.0 | 5.0 |
| Egg | 3.2 | 3.2 |
| Chicken Digest | 2.6 | 2.6 |
| Fish Meal | 1.0 | 1.0 |
| Brewers Yeast | 0.5 | 0.5 |
| Sodium Chloride | 0.5 | 0.6 |
| Potassium Chloride | 0.5 | 0.4 |
| DL-Methionine | 0.3 | 0.4 |
| Minerals | 0.3 | 0.3 |
| Vitamins | 0.3 | 0.3 |
| Choline Chloride | 0.3 | 0.3 |
| Dicalcium Phosphate | 0.2 | 0.6 |
| Calcium Carbonate | 0.2 | 0.6 |

The nutrient composition of the two experimental diets is summarized in Table 2 below.

TABLE 2

Nutrient Composition of Experimental Diets Tested

| NUTRIENTS | RICE-BASED DIET | CORN/SORGHUM-BASED DIET |
|---|---|---|
| Protein | 37.21% | 32.62% |
| Moisture | 00.00% | 00.00% |
| Ash | 07.56% | 07.29% |
| Fat | 15.82% | 15.59% |
| Crude Fiber | 02.25% | 02.53% |
| Metabolizable Energy | 5039.83 kcal/kg | 5090.19 kcal/kg |
| Carbohydrate | 35.45% | 36.71% |
| Calcium | 01.30% | 01.30% |
| Phosphorus | 01.20% | 01.10% |

At the initiation of the study, the body weight (lbs.) of each cat was measured and recorded. The animals then began a 6-week period of maintenance feeding, during which the cats were fed a daily amount of food to maintain body weight. After concluding the 6-week period of maintenance feeding, body weights were again measured and recorded. The cats were then fed ad libitum for an additional 8-week period, after which body weights were again measured and recorded. The initial body weights, as well as the body weights recorded and changes in body weight after the 6-week period of maintenance feeding and the 8-week period of ad libitum feeding are presented in Table 3 below.

TABLE 3

Weight Changes

| RICE-BASED DIET | INITIAL WEIGHT | WEIGHT AFTER 6 WEEKS | WT. AFTER 8 WEEKS AD LIB. | CHANGE IN WT. AFTER 6 WKS. MAINT. | CHANGE IN WT. AFTER 8 WKS. AD LIB. |
|---|---|---|---|---|---|
| Leroy | 8.40 | 8.50 | 10.00 | 0.10 | 1.50 |
| Cooper | 7.60 | 7.75 | 9.00 | 0.15 | 1.25 |
| Dash | 6.85 | 6.90 | 7.45 | 0.05 | 0.55 |
| Minstral | 6.25 | 6.40 | 7.00 | 0.15 | 0.60 |
| Lucifer | 6.30 | 6.15 | 6.45 | −0.15 | 0.30 |
| Scarlet | 5.35 | 5.35 | 5.45 | 0.00 | 0.10 |
| Jasmine | 5.10 | 5.15 | 5.55 | 0.05 | 0.35 |
| Nutmeg | 4.50 | 4.40 | 4.40 | −0.10 | 0.00 |
| Mean | 6.29 | 6.33 | 6.91 | 0.031 | 0.581 |
| SD | 1.309 | 1.371 | 1.884 | 0.110 | 0.534 |

| CORN/SORGHUM-BASED DIET | INITIAL WEIGHT | WEIGHT AFTER 6 WEEKS | WT. AFTER 8 WEEKS AD LIB. | CHANGE IN WT. AFTER 6 WKS. MAINT. | CHANGE IN WT. AFTER 8 WKS. AD LIB. |
|---|---|---|---|---|---|
| Abe | 8.60 | 8.80 | 9.40 | 0.20 | 0.60 |
| Lionall | 7.10 | 7.20 | 7.40 | 0.10 | 0.20 |
| Sophie | 6.90 | 7.10 | 8.05 | 0.20 | 0.95 |
| Tabatha | 6.15 | 6.30 | 7.30 | 0.15 | 1.00 |
| Rudolf | 5.55 | 5.40 | 6.00 | −0.15 | 0.60 |
| Eclaire | 6.00 | 5.95 | 6.40 | −0.05 | 0.45 |
| Meg | 4.40 | 4.40 | 4.40 | 0.00 | 0.00 |
| Romany | 5.25 | 5.20 | 5.15 | −0.05 | −0.05 |
| Mean | 6.24 | 6.29 | 6.76 | 0.050 | 0.469 |
| SD | 1.290 | 1.386 | 1.613 | 0.131 | 0.398 |

Food intake (g) was measured daily and calculated as the amount of food eaten in 15 minutes on the actual test day (MRT). MRT food intake is presented in Table 4 below as a value of both grams/day and kcal/day.

TABLE 4

MRT Food Intake

| RICE-BASED DIET | TEST 1 IAMS g/day | TEST 2 RICE g/day | TEST 3 RICE g/day | TEST 1 IAMS kcal/day | TEST 2 RICE kcal/day | TEST 3 RICE kcal/day |
|---|---|---|---|---|---|---|
| Leroy | 35 | 25 | 20 | 156.9 | 115.5 | 92.4 |
| Cooper | 40 | 30 | 55 | 179.3 | 138.6 | 254.1 |
| Dash | 40 | 25 | 30 | 179.3 | 115.5 | 138.6 |
| Minstral | 30 | 25 | 45 | 134.5 | 115.5 | 207.9 |
| Lucifer | 25 | 20 | 20 | 112.1 | 92.4 | 92.4 |
| Scarlet | 35 | 30 | 30 | 156.9 | 138.6 | 138.6 |
| Jasmine | 30 | 25 | 15 | 134.5 | 115.5 | 69.3 |
| Nutmeg | 25 | 25 | 20 | 112.1 | 115.5 | 92.4 |
| Mean | 32.5 | 25.6 | 29.4 | 145.7 | 118.4 | 135.7 |
| SD | 5.98 | 3.20 | 14.0 | 26.8 | 14.80 | 64.67 |

| CORN/SORGHUM-BASED DIET | TEST 1 IAMS g/day | TEST 2 SORGHUM g/day | TEST 3 SORGHUM g/day | TEST 1 IAMS kcal/day | TEST 2 SORGHUM kcal/day | TEST 3 SORGHUM kcal/day |
|---|---|---|---|---|---|---|
| Abe | 50 | 35 | 50 | 224.2 | 164.3 | 234.7 |
| Lionall | 50 | 35 | 50 | 224.2 | 164.3 | 140.8 |
| Sophie | 50 | 35 | 45 | 224.2 | 164.3 | 211.2 |
| Tabatha | 45 | 35 | 30 | 201.7 | 164.3 | 140.8 |
| Rudolf | 30 | 20 | 15 | 134.5 | 93.9 | 70.4 |
| Eclaire | 15 | 10 | 10 | 67.2 | 46.9 | 46.9 |
| Meg | 20 | 20 | 10 | 89.7 | 93.9 | 46.9 |
| Romany | 30 | 25 | 10 | 134.5 | 117.3 | 46.9 |
| Mean | 36.3 | 26.9 | 25.0 | 162.5 | 126.1 | 117.3 |
| SD | 14.33 | 9.61 | 16.24 | 64.24 | 45.12 | 76.0 |

Iams Original Formula Cat Food = 448.300 kcal/100 g
Rice-Based Diet = 461.949 kcal/100 g
Corn/Sorghum-Based Diet = 469.316 kcal/100 g Average food intake (g/day) by male cats versus female cats is presented in Table 5 below. The rice-based diet is represented by Diet No. 5. The corn/sorghum-based diet is represented by Diet No. 6.

TABLE 5

Average Food Intake (g/day) Male v. Female

| CAT NAME | GROUP NO. | CAT NO. | DIET NO. | MAINT. g/day | AD LIB. g/day | INCREASE g/day | % INCREASE |
|---|---|---|---|---|---|---|---|
| Leroy | 2 | 1 | 5 | 69.13 | 116.78 | 47.65 | 68.93 |
| Cooper | 2 | 2 | 5 | 69.24 | 120.44 | 51.20 | 73.95 |
| Lucifer | 3 | 1 | 5 | 54.46 | 81.67 | 27.21 | 49.96 |
| Mean | | | | 64.28 | 106.30 | 42.02 | 64.28 |
| Dash | 2 | 3 | 5 | 62.10 | 100.44 | 38.34 | 61.74 |
| Minstral | 2 | 4 | 5 | 53.15 | 86.34 | 33.19 | 62.45 |
| Scarlett | 3 | 2 | 5 | 52.56 | 53.48 | 00.92 | 01.75 |
| Jasmine | 3 | 3 | 5 | 44.78 | 61.10 | 16.32 | 36.44 |
| Nutmeg | 3 | 4 | 5 | 45.33 | 54.66 | 09.33 | 20.58 |
| Mean | | | | 51.58 | 54.66 | 19.62 | 36.59 |
| Abe | 1 | 1 | 6 | 90.52 | 108.79 | 18.27 | 20.18 |
| Lionall | 1 | 2 | 6 | 70.73 | 69.74 | −00.99 | −1.40 |
| Rudolf | 4 | 1 | 6 | 44.88 | 84.19 | 39.31 | 87.59 |
| Mean | | | | 68.71 | 87.57 | 18.86 | 35.46 |
| Sophie | 1 | 3 | 6 | 77.92 | 97.24 | 19.32 | 24.79 |
| Tabatha | 1 | 4 | 6 | 77.81 | 88.48 | 10.67 | 13.71 |
| Eclaire | 4 | 2 | 6 | 51.79 | 70.24 | 18.45 | 35.62 |
| Meg | 4 | 3 | 6 | 42.00 | 45.16 | 03.16 | 07.52 |
| Romany | 4 | 4 | 6 | 35.58 | 53.69 | 18.11 | 50.90 |
| Mean | | | | 57.02 | 70.96 | 13.94 | 26.51 |

At the beginning and end of each feeding period, plasma glucose and insulin responses to a meal feeding of either the rice-based or corn/sorghum-based diet were measured for each cat. Serial venous blood samples were obtained for analysis of glucose and insulin concentration immediately before and for 24 hours after a 15-minute exposure to each experimental diet.

Results

The cats fed the corn/sorghum-based diet ate less and gained less weight than those cats fed the rice-based diet. Male cats fed the rice-based diet ate on average an additional 42.02 grams of food per day when fed ad libitum, as compared to when fed at maintenance. This corresponds to a 64.28% increase in food intake (g/day). While not quite as pronounced, female cats fed the rice-based diet ate on average an additional 19.62 grams of food per day when fed ad libitum, as compared to when fed at maintenance. This corresponds to a 36.59% increase in food intake (g/day).

Both male and female cats ate less on average when fed the corn/sorghum-based diet. Male cats fed the corn/sorghum-based diet ate on average an additional 18.86 grams of food per day when fed ad libitum, as compared to when fed at maintenance. This corresponds to a 35.46% increase in food intake (g/day). Again, while not quite as pronounced, female cats fed the corn/sorghum-based diet ate on average an additional 13.94 grams of food per day when fed ad libitum, as compared to when fed at maintenance. This corresponds to a 26.51% increase in food intake (g/day).

Figure 1:
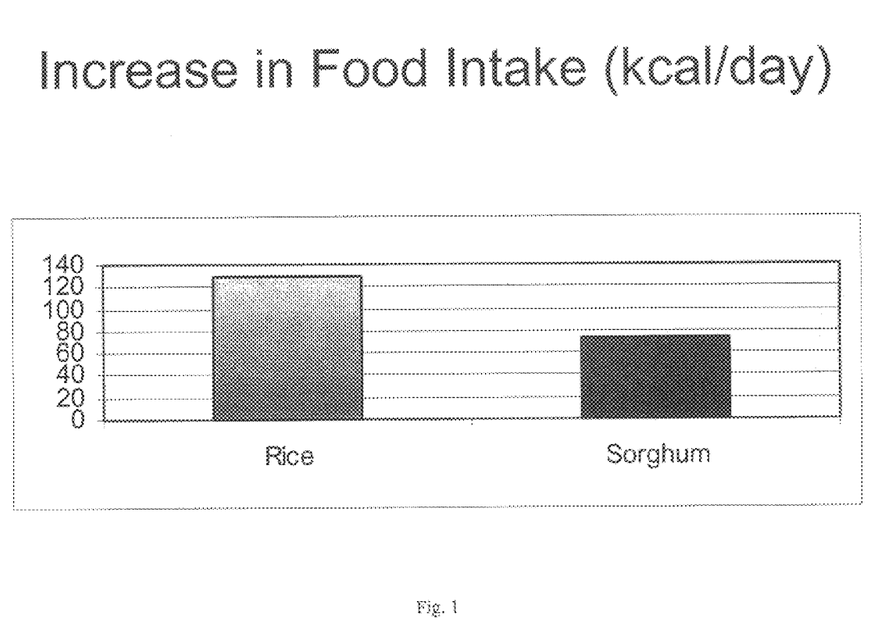
FIG. 1 is a graph of the influence of a sorghum-based diet of the present invention as compared to a rice-based diet on food intake (kcal/day). The value for the rice-based diet reflects the mean intake increase [(42.02×3)+(19.62×5)] multiplied by the caloric density (461.949 kcal/100 g). The value for the sorghum-based diet reflects the mean intake increase [(18.86×3)+(13.94×5)] multiplied by the caloric density (469.316 kcal/100 g).
Figure 2:
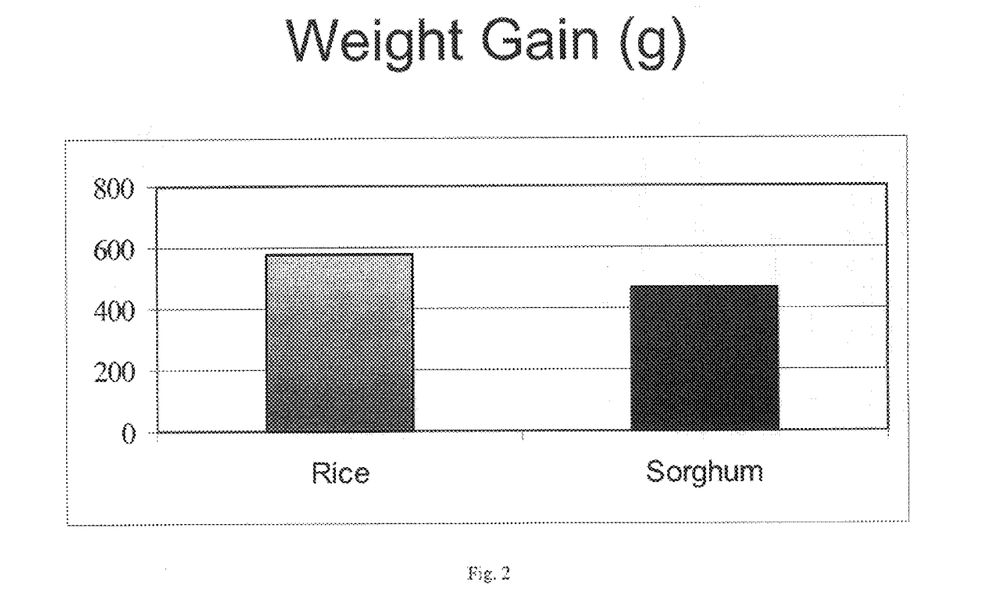
FIG. 2 is a graph of the influence of a sorghum-based diet of the present invention as compared to a rice-based diet on weight gain (g).
Figure 3:
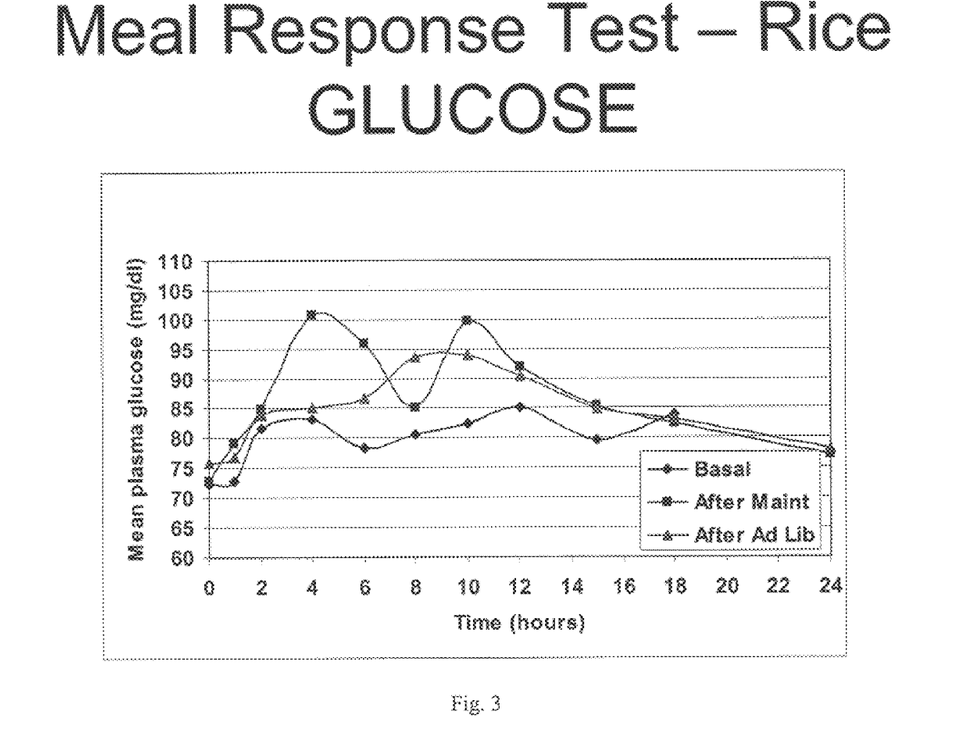
FIG. 3 is a plot diagram of the influence a 15-minute exposure to a rice-based diet has on plasma glucose concentration. Mean plasma glucose concentration is expressed in (mg/dl).
Figure 4:
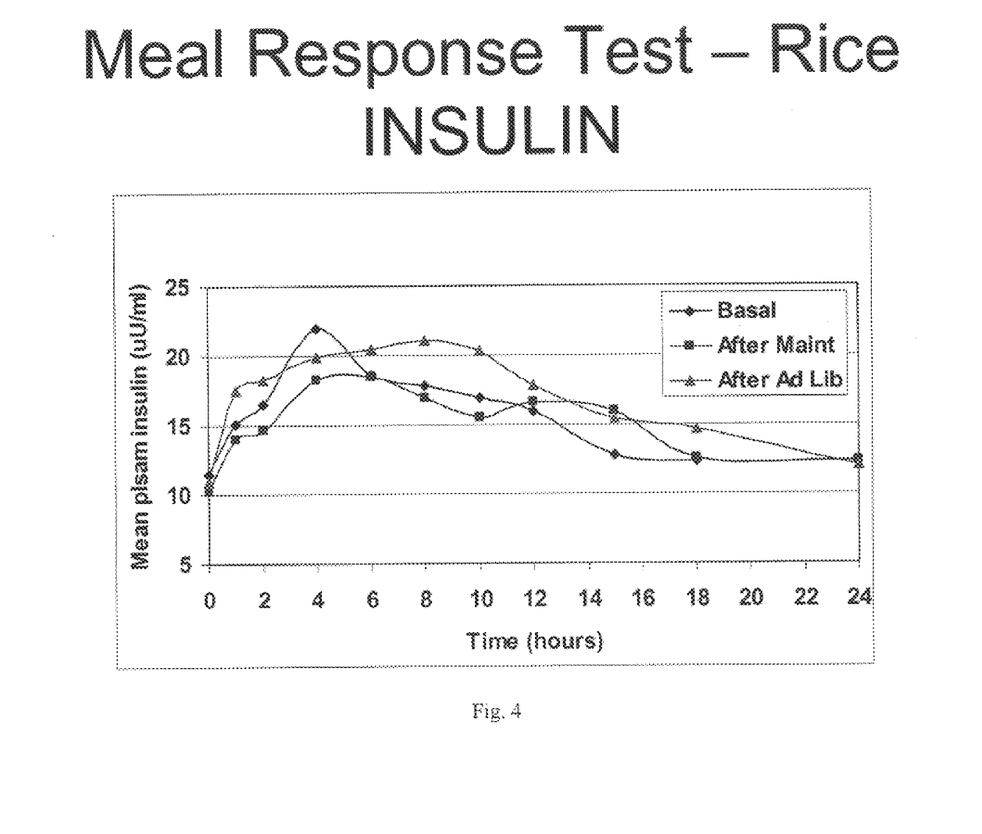
FIG. 4 is a plot diagram of the influence a 15-minute exposure to a rice-based diet has on plasma insulin concentration. Mean plasma insulin concentration is expressed in ($\mu$U/ml).
Figure 5:
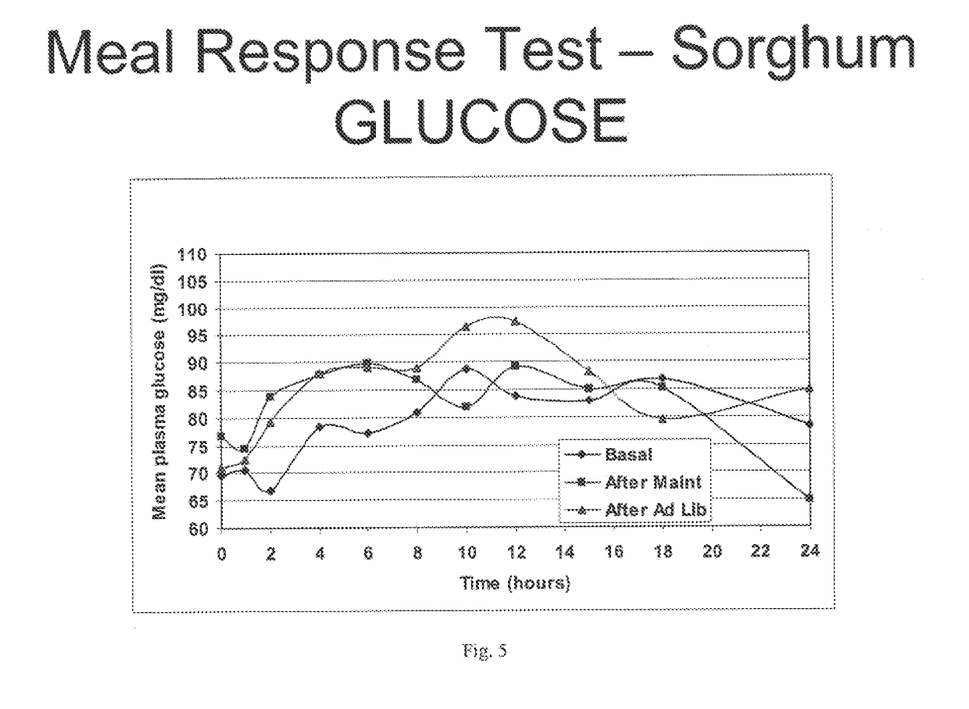
FIG. 5 is a plot diagram of the influence a 15-minute exposure to a sorghum-based diet of the present invention has on plasma glucose concentration. Mean plasma glucose concentration is expressed in (mg/dl).
Figure 6:
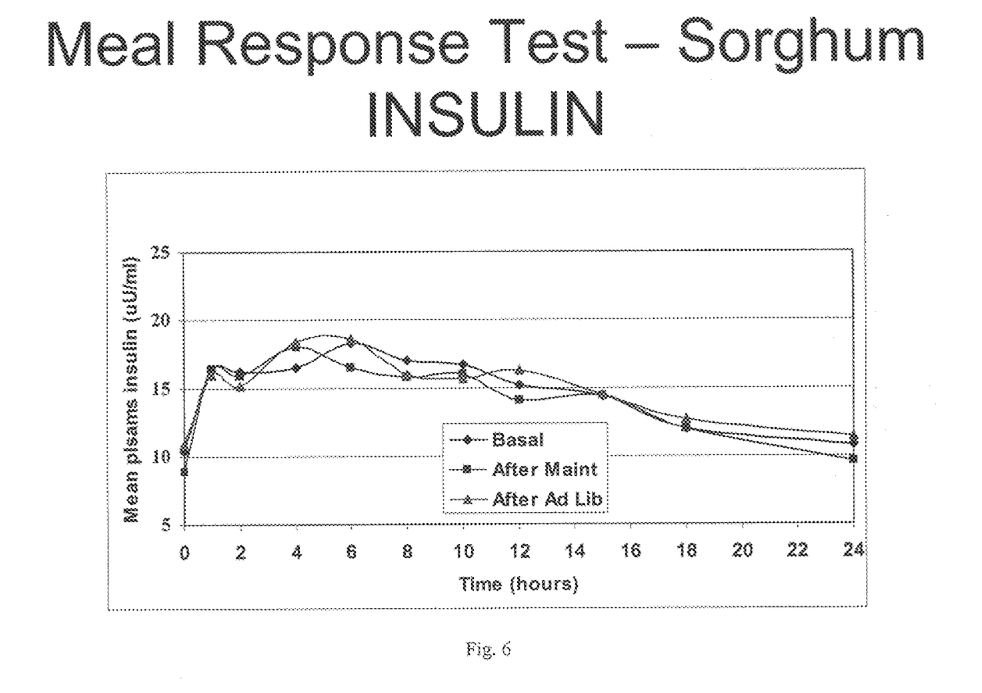
FIG. 6 is a plot diagram of the influence a 15-minute exposure to a sorghum-based diet of the present invention has on plasma insulin concentration. Mean plasma insulin concentration is expressed in ($\mu$U/ml).
Figure 7:
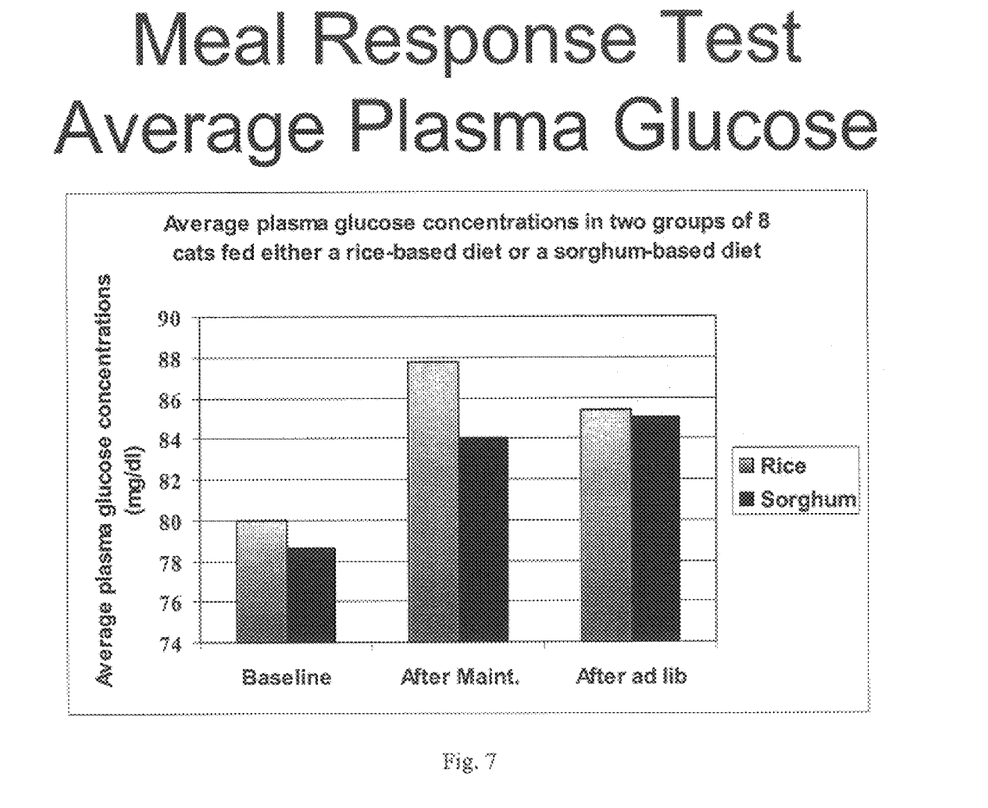
FIG. 7 is a graph of average plasma glucose concentrations in two groups of 8 cats fed either a rice-based diet or a sorghum-based diet of the present invention. Average plasma glucose concentrations are expressed in (mg/dl).
Figure 8:
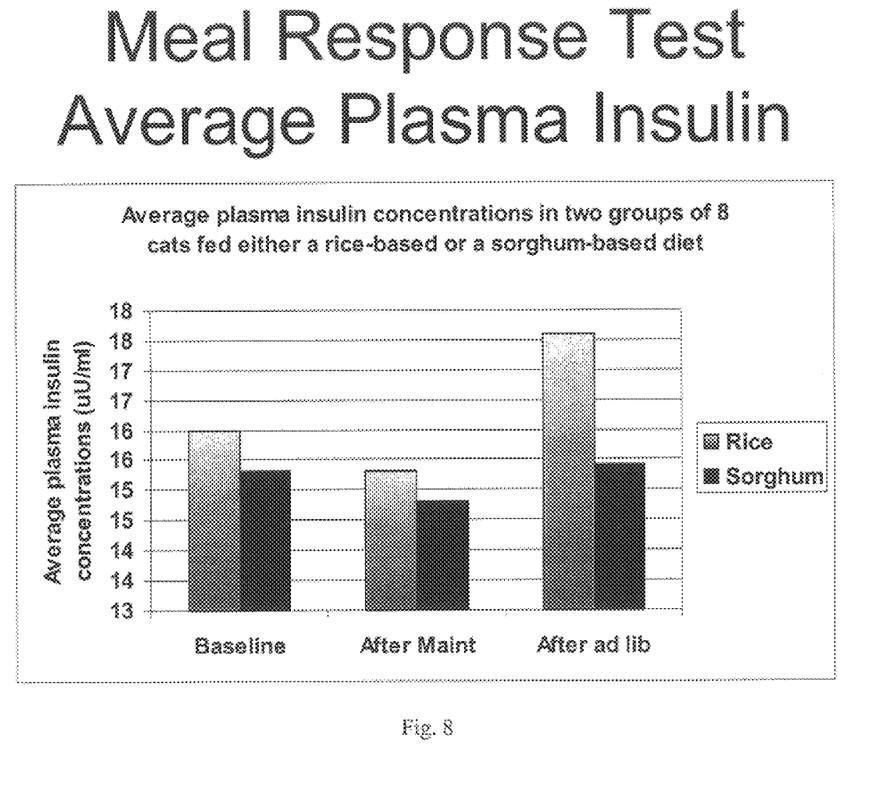
FIG. 8 is a graph of average plasma insulin concentrations in two groups of 8 cats fed either a rice-based diet or a sorghum-based diet of the present invention. Average plasma insulin concentrations are expressed in ($\mu$U/ml).
Figure 9:
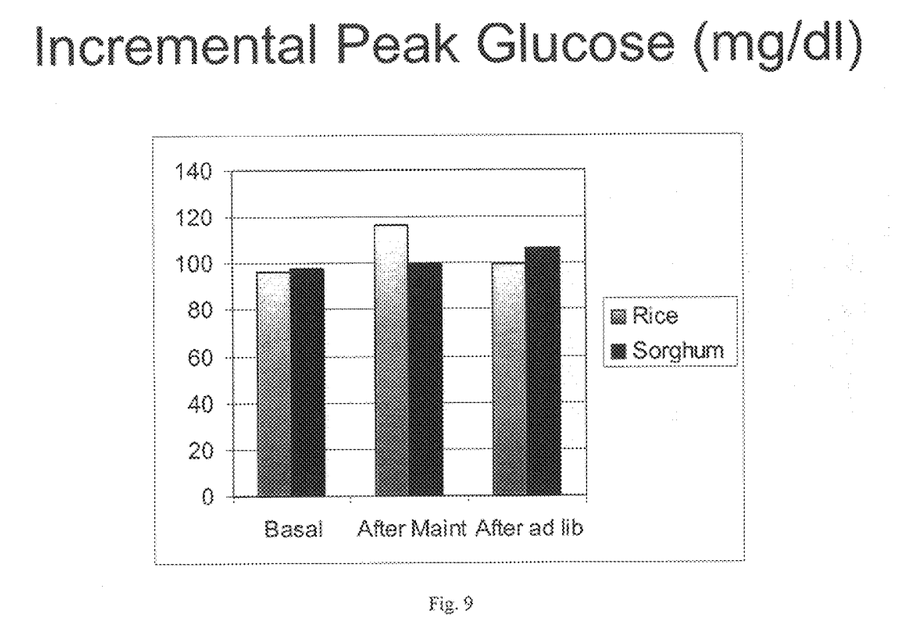
FIG. 9 is a graph of incremental peak glucose values in cats fed either a rice-based diet or a sorghum-based diet of the present invention. Glucose concentration is expressed in (mg/dl).
Figure 10:
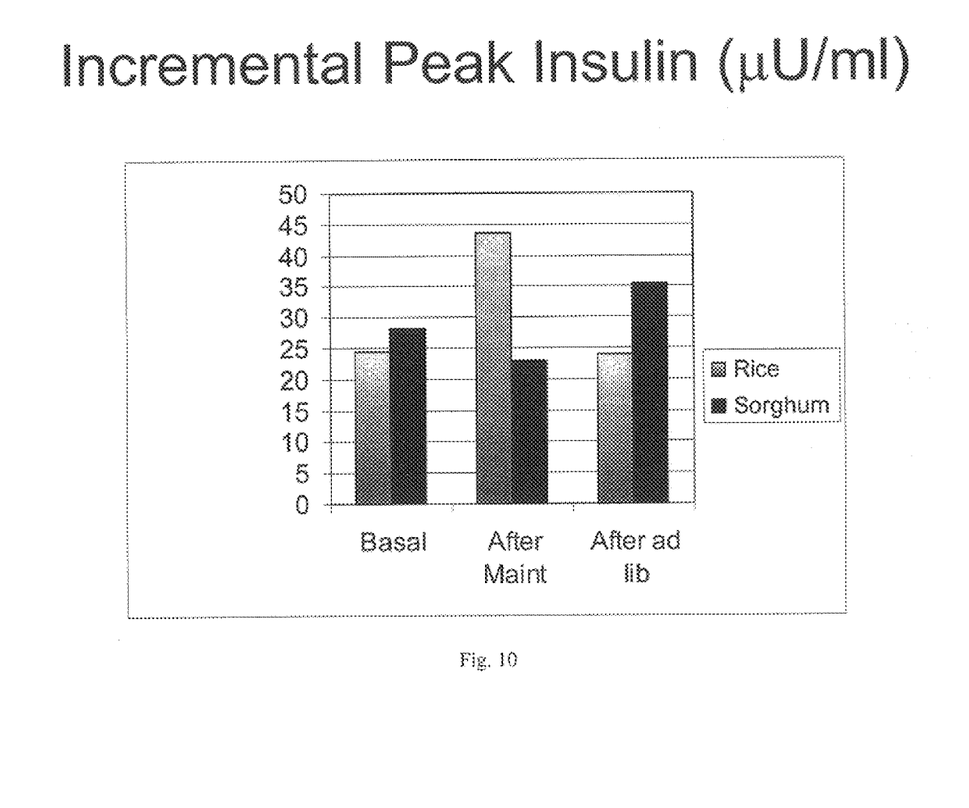
FIG. 10 is a graph of incremental peak insulin values in cats fed either a rice-based diet or a sorghum-based diet of the present invention. Insulin concentration is expressed in ($\mu$U/ml).

In addition, average plasma glucose and insulin concentrations were consistently lower in cats fed the corn/sorghum-based diet, compared to the results obtained from cats fed the rice-based diet. See FIGS. 1–10 for a graphical representation of the results from this Example 1.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A process for limiting weight gain in a cat comprising the step of feeding said cat a pet food composition comprising a source of protein, a source of fat, and a source of carbohydrates from a grain source that excludes rice selected from the group consisting of a blend of sorghum and barley, a blend of corn and barley, a blend of corn, sorghum, and barley, a blend of corn and sorghum and a blend of corn, sorghum and oats.

2. A process as claimed in claim 1 in which feeding said cat said pet food composition decreases the postprandial blood glucose and insulin response of said cat as compared to when feeding a rice-based diet.

3. A process as claimed in claim 1 in which feeding said cat said pet food composition promotes satiety.

4. A process as claimed in claim 1 in which feeding said cat said pet food composition promotes a voluntary decrease in food intake.

5. A process as claimed in claim 4 in which said cat is a male cat.

6. A process as claimed in claim 1 in which said pet food composition is fed ad libitum.

7. A process as claimed in claim 1 in which said grain source is a low glycemic index grain source.

8. A process as claimed in claim 7 in which said grain source has a glycemic index that is less than rice.

9. A process as claimed in claim 7 in which said low glycemic index grain source comprises a blend of corn and sorghum.

10. A process as claimed in claim 9 in which the ratio of corn to sorghum is from about 1:5 to about 5:1.

11. A process as claimed in claim 9 in which the ratio of corn to sorghum is from about 1:3 to about 3:1.

12. A process as claimed in claim 9 in which the ratio of corn to sorghum is from about 1:1.

13. A process as claimed in claim 7 in which said low glycemic index grain source comprises a blend of corn, sorghum, and barley.

14. A process as claimed in claim 13 in which the ratio of corn to sorghum to barley is from about 1:1:5 to about 1:5:1 to about 5:1:1.

15. A process as claimed in claim 13 in which the ratio of corn to sorghum to barley is from about 1:1:3 to about 1:3:1 to about 3:1:1.

16. A process as claimed in claim 13 in which the ratio of corn to sorghum to barley is about 1:1:1.

17. A process as claimed in claim 7 in which said low glycemic index grain source comprises a blend of corn, sorghum, and oats.

18. A process as claimed in claim 17 in which the ratio of corn to sorghum to oats is from about 1:1:5 to about 1:5:1 to about 5:1:1.

19. A process as claimed in claim 17 in which the ratio of corn to sorghum to oats is from about 1:1:3 to about 1:3:1 to about 3:1:1.

20. A process as claimed in claim 17 in which the ratio of corn to sorghum to oats is from 1:1:1.

21. A process for limiting weight gain in a cat comprising the step of feeding said cat a pet food composition comprising from about 25 to about 45% crude protein, from about 4 to about 30% fat, from about 2 to about 20% total dietary fiber, and a source of carbohydrates from a grain source that excludes rice selected from the group consisting of a blend of sorghum and barley, a blend of corn and barley, a blend of corn, sorghum, and barley, a blend of corn and sorghum and a blend of corn, sorghum and oats.

22. A process as claimed in claim 21 in which feeding said cat said pet food composition decreases the postprandial blood glucose and insulin response of said cat as compared to when feeding a rice-based diet.

23. A process as claimed in claim 21 in which feeding said cat said pet food composition promotes satiety.

24. A process as claimed in claim 21 in which feeding said cat said pet food composition promotes a voluntary decrease in food intake.

25. A process as claimed in claim 24 in which said cat is a male cat.

26. A process as claimed in claim 21 in which said pet food composition is fed ad libitum.

27. A process as claimed in claim 21 in which said grain source is a low glycemic index grain source.

28. A process as claimed in claim 27 in which said grain source has a glycemic index that is less than rice.

29. A process as claimed in claim 28 in which said low glycemic index grain source is selected from the group consisting of a blend of corn and sorghum, a blend of corn, sorghum, and barley, and a blend of corn, sorghum, and oats.

30. A process as claimed in claim 29 further comprising from about 1 to about 11 weight percent of supplemental total dietary fiber of fermentable fibers which have an organic matter disappearance of 15 to 60 weight percent when fermented by fecal bacteria for a 24 hour period.

* * * * *